June 6, 1950   J. J. BYRNES   2,510,680
MOTOR MOUNTING PLATE
Filed Oct. 13, 1948
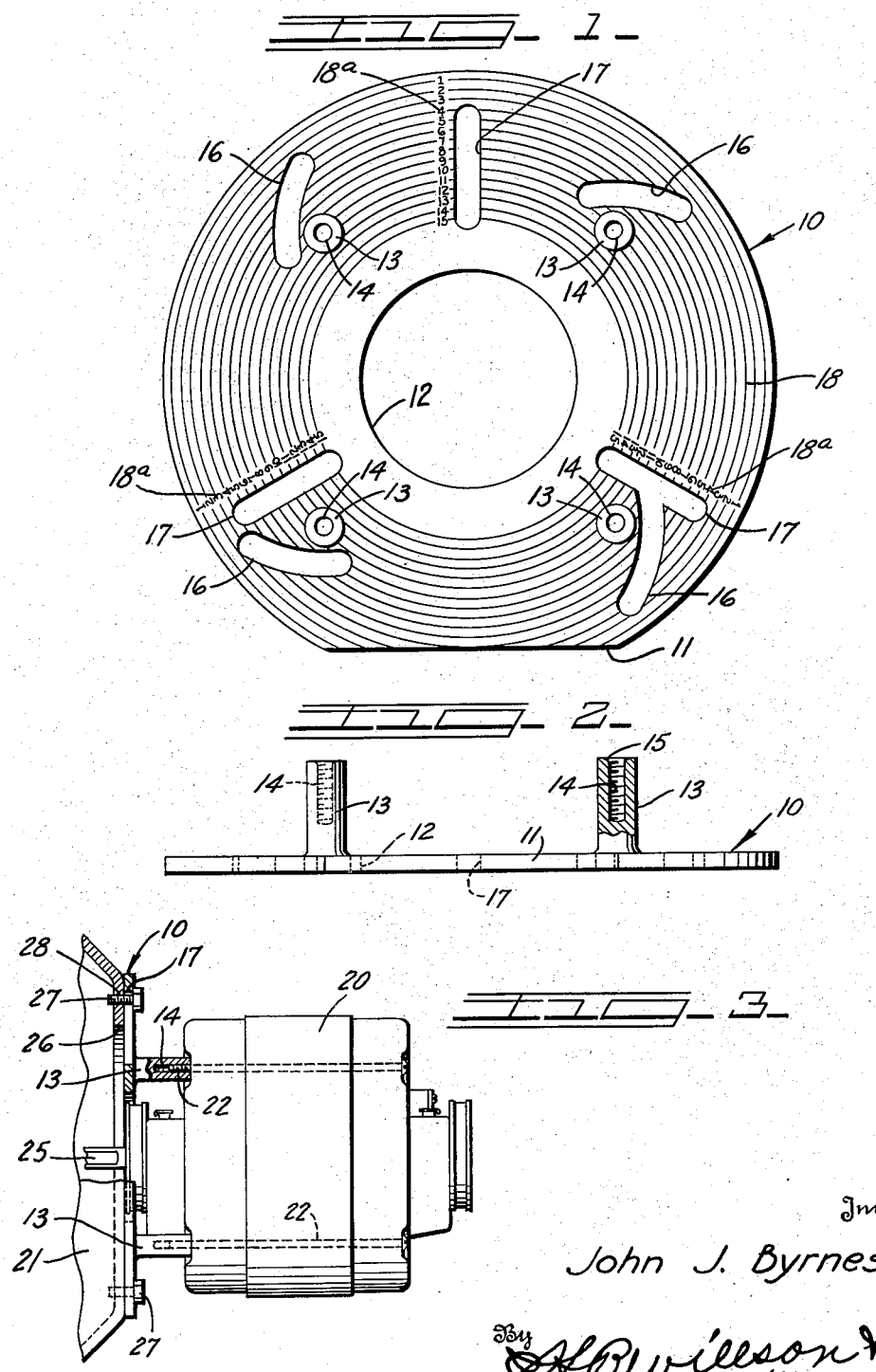
Inventor
John J. Byrnes
By H. B. Willson & Co.
Attorneys Patented June 6, 1950

2,510,680

UNITED STATES PATENT OFFICE 2,510,680

MOTOR MOUNTING PLATE

John J. Byrnes, Newark, N. J.

Application October 13, 1948, Serial No. 54,270

4 Claims. (Cl. 248—23)

The invention is a motor mounting plate or adapter especially useful to oil burner service men, although it may be used by others, and for mounting electric motors on various kinds of electrical apparatus and motor supports.

Oil burner service men are frequently called upon to service equipment having burned-out or damaged motors which have to go to the shop for extensive repairs or rebuilding. It is usually important that there be no long interruption in the operation of the oil burner, the electric freezer or other equipment driven by the motor, and it is customary to use a temporary motor. The many kinds of such equipment have motors with various arrangements and spacings of bolt holes for fastening the motor to the base or to a casing such as the fan housing of an oil burner. It is impossible for the service man to carry with him such a large assortment of motors that he would have one with the arrangement of bolt holes necessary for the particular burner or other equipment which he must restore to immediate serviceable condition. It is therefore a primary object of the invention to provide an adapter in the form of a plate having means to which a standard electric motor may be secured and which also has slots so variously located that two or more of them will align or register with the motor-attaching bolt holes in the base, the fan housing or other part of the equipment that supports the motor. The service man may thus carry with him one or more standard motors with the adapters fastened to them and he will be able to quickly and temporarily restore the broken down equipment to a serviceable condition while its motor is being repaired.

Another object of the invention is to provide a device of the above character in the form of a one-piece casting which is relatively inexpensive to produce and highly effective for its intended purpose.

A further object of the invention is the provision of such a device provided with a plurality of numbered concentric indicating circles to facilitate the proper alignment of the motor with the apparatus or equipment to which it is to be fastened.

Still other objects reside in the combination of elements, arrangement of parts, and features of construction, all as will be more fully pointed out hereinafter and disclosed in the accompanying drawings wherein there is shown a preferred embodiment of this inventive concept.

In the drawings:

Figure 1 is a plan or face view of one form of device embodying features of the instant inventive concept.

Figure 2 is an edge elevation of the structure disclosed in Figure 1, certain parts being in section, and certain other concealed parts being indicated in dotted lines; and Figure 3 is a side view partially in elevation and partially in section disclosing the motor mounting plate in association with an electric motor and a support for the same.

Similar reference characters refer to similar parts throughout the several views of the drawings.

Referring now to the drawing in detail the mounting plate or adapter of the instant invention comprises a substantially circular plate generally indicated at 10 provided with a cut-away portion 11, and having a relatively large central aperture 12. The flat or cut-away portion permits the plate to clear parts on some makes of oil burners. Outwardly extending from one face of the plate 10 are a plurality, in the illustrative embodiment shown, four, of lugs 13, provided with longitudinally extending tapped holes 14 which may be countersunk as indicated at 15. Adjacent each of lugs 14 is an arcuate and helically positioned slot 16 so arranged that relatively slight rotation of plate 10 will align a portion of each slot 16 with a bolt hole in a device to which the motor is to be secured, in a manner to be more fully described hereinafter, to permit the application of plate 10 to a plurality of mounting surfaces having differently spaced bolt holes. Additional radial slots 17 are also positioned in the plate at approximately 120° apart to accommodate still other types of mountings. A plurality of concentric indicating circles 18 formed integrally with the plate extend circumferentially about the plate intersecting the slots 16 and 17 at fixed positions relative to the extent thereof, to facilitate the alignment of bolts passed through such slots. If desired indicating indicia 18a such as numerals may be cast on the plate between the indicating circular lines to facilitate identification thereof. The entire device may be a one-piece casting and is preferably made of aluminum.

One way of using the adapter plate is disclosed in Figure 3, wherein an electric motor 20 of any desired or conventional type is adapted to be applied to a fan housing 21 of an oil burner, from which the regular motor has been removed. It is to be noted that the lugs or posts 13 of plate 10 are positioned and arranged in suitable spaced relation for reception of the bolts 22 of one standard form of electric motor. These bolts 22 normally fasten the two bell-ends to the central portion of the motor body. In the utilization of the device, plate 10 is first secured to motor 20 by removing the securing nuts (not shown) from the motor bolts 22, and securing the extremities of the latter within the threaded bores 14 of lugs 13 thus fastening plate 10 and motor 20 in unitary related assembly. The armature shaft 25 of the motor is adapted to extend through the central aperture 12 inwardly of a corresponding aperture 26 in the fan housing for any suitable connection to the shaft of the fan. After such connection has been made plate 10 is so positioned that one of the securing bolts 27 may be placed in one of the slots 16 or 17 and positioned in an associated threaded aperture 28 in the fan housing. Plate 10 is then slightly rotated until one or more of the remaining bolt holes 28 are suitably aligned with one or more of the slots 16 or 17 according to the type of motor normally used. The previously mentioned concentric and numbered indicating circles 18 serve to facilitate proper alignment of the motor. The remaining bolts 27 are then passed through their associated slots into the aligned threaded apertures 28 and tightened, securely to hold the temporary motor 20 in position on the fan housing. The central opening 12 is made sufficiently large to also receive one of the parts of the motor 20 normally used in supporting or mounting it.

From the foregoing it will now be readily apparent that a single motor secured to an adapter plate of the instant invention may be readily and expeditiously applied to any one of a large number of different types of fan housings, thus permitting the use of a single type replacement motor regardless of the type of burner to which motor repairs are to be effected, thus obviating the necessity for the service man carrying about a large number of different types of motors, or returning to the shop for a particular motor for application to a particular burner during such repairs.

While in the foregoing the adapter plate has been described specifically in connection with a particular application it is to be understood that the plate is equally applicable to a wide number of other uses wherein a specific type of motor having specifically spaced bolts is to be employed in connection with apparatus which may be provided with bolt holes of different spacing and locations.

As many embodiments may be made of the inventive concept, and as many modifications may be made of the embodiment hereinbefore shown and described, it is to be understood that all matter herein is to be interpreted merely as illustrative and not in a limiting sense.

I claim:

1. A motor-mounting adapter plate for selectively associating a motor with apparatus having differently spaced bolt holes, comprising a substantially circular plate having a central aperture therein, said plate also having an annular series of slots located between its outer edge and said central aperture for the reception of apparatus-engaging bolts, and lugs extending from one face of said plate and having threaded motor bolt receiving sockets in their ends.

2. The structure of claim 1 in which said slots are arcuate in shape and helically arranged.

3. The structure of claim 1 in which said slots are straight and extend radially of said plate.

4. A motor-mounting adapter plate for selectively associating a motor with apparatus having differently spaced bolt holes, comprising a substantially circular plate having a central aperture therein, said plate also having on one face a series of circumferentially-spaced, straight, radial slots and a series of circumferentially-spaced, arcuate and helically arranged slots, all of said slots being located between the outer edge of and the central opening of said plate and adapted for the reception of apparatus engaging bolts, and lugs extending from one face of said plate and having threaded motor bolt receiving sockets in their ends.

JOHN J. BYRNES.

REFERENCES CITED

The following references are of record in the file of this patent:

UNITED STATES PATENTS

| Number | Name | Date |
| --- | --- | --- |
| 2,359,002 | Ryther | Sept. 26, 1944 |
| 2,486,032 | Jiminez | Oct. 25, 1949 |